United States Patent
Gurulé et al.

(12) United States Patent
Guruléet al.

(10) Patent No.: US 6,811,163 B1
(45) Date of Patent: Nov. 2, 2004

(54) CABINET TRANSPORT AND STORAGE CART

(76) Inventors: Jim Gurulé, 800 Danville Rd., Danville, CA (US) 94526; James C. Brignolio, 14755 S. Prescott Rd., Manteca, CA (US) 95336

( * ) Notice: Subject to any disclaimer, the term of this patent is extended or adjusted under 35 U.S.C. 154(b) by 33 days.

(21) Appl. No.: 10/211,000

(22) Filed: Aug. 1, 2002

(51) Int. Cl.[7] .................................................. B62B 3/00
(52) U.S. Cl. ................................................... 280/79.3
(58) Field of Search .......................... 280/47.34, 47.35, 280/79.11, 79.3, 79.7; 220/4.28, 4.34; 410/3

(56) References Cited

U.S. PATENT DOCUMENTS

| 2,537,909 | A | * | 1/1951 | Puddester | 188/5 |
| 2,598,800 | A | | 6/1952 | Kopper | |
| 2,919,045 | A | * | 12/1959 | Waugh et al. | 220/4.34 |
| 3,374,915 | A | * | 3/1968 | Verhein et al. | 220/4.28 |
| 3,861,554 | A | | 1/1975 | Legg et al. | |
| 3,888,379 | A | | 6/1975 | Folberth | |
| 4,127,202 | A | * | 11/1978 | Jennings et al. | 414/537 |
| 4,222,579 | A | | 9/1980 | Frydendal | |
| 4,275,665 | A | | 6/1981 | Silverman | |
| 4,609,116 | A | * | 9/1986 | Simms | 217/12 R |
| 5,263,701 | A | * | 11/1993 | Kleinhen | 271/145 |
| 5,381,915 | A | * | 1/1995 | Yardley | 220/4.33 |
| 5,593,259 | A | * | 1/1997 | Kuo | 410/3 |
| 5,595,305 | A | | 1/1997 | Hart | |
| D409,811 | S | | 5/1999 | Hutchinson | |
| 5,967,325 | A | * | 10/1999 | McIntire | 206/541 |
| 6,019,226 | A | * | 2/2000 | Zajdlik et al. | 206/600 |
| 6,386,560 | B2 | * | 5/2002 | Calender | 280/47.34 |

FOREIGN PATENT DOCUMENTS

| GB | 1379063 | * | 1/1975 | ................ 280/79.3 |

* cited by examiner

*Primary Examiner*—Frank Vanaman
(74) *Attorney, Agent, or Firm*—Thomas R. Lampe

(57) ABSTRACT

Transport apparatus includes a four sided base with four side panels extending upwardly from the four base sides. The side panels are releasably connected to the base and the side panels are releasably connected to one another. Any of the side panels can be removed to obtain access to the interior of the apparatus, the remaining three panels forming a self-supporting structure. An open topped trough is formed in the base for supporting elongated cabinet components in an upright condition.

7 Claims, 4 Drawing Sheets

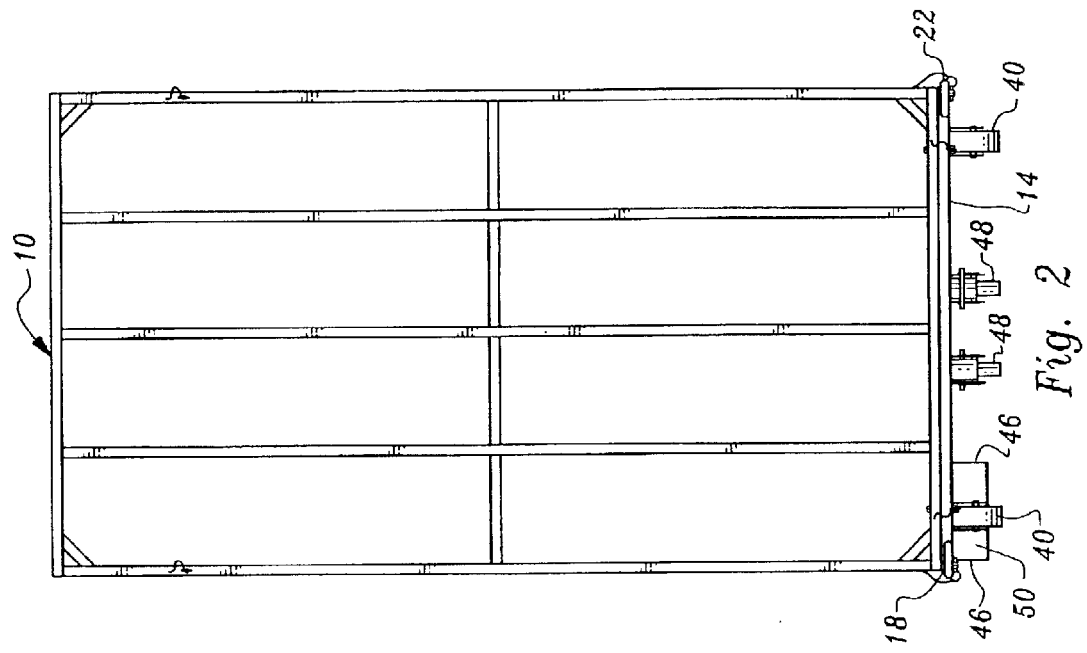
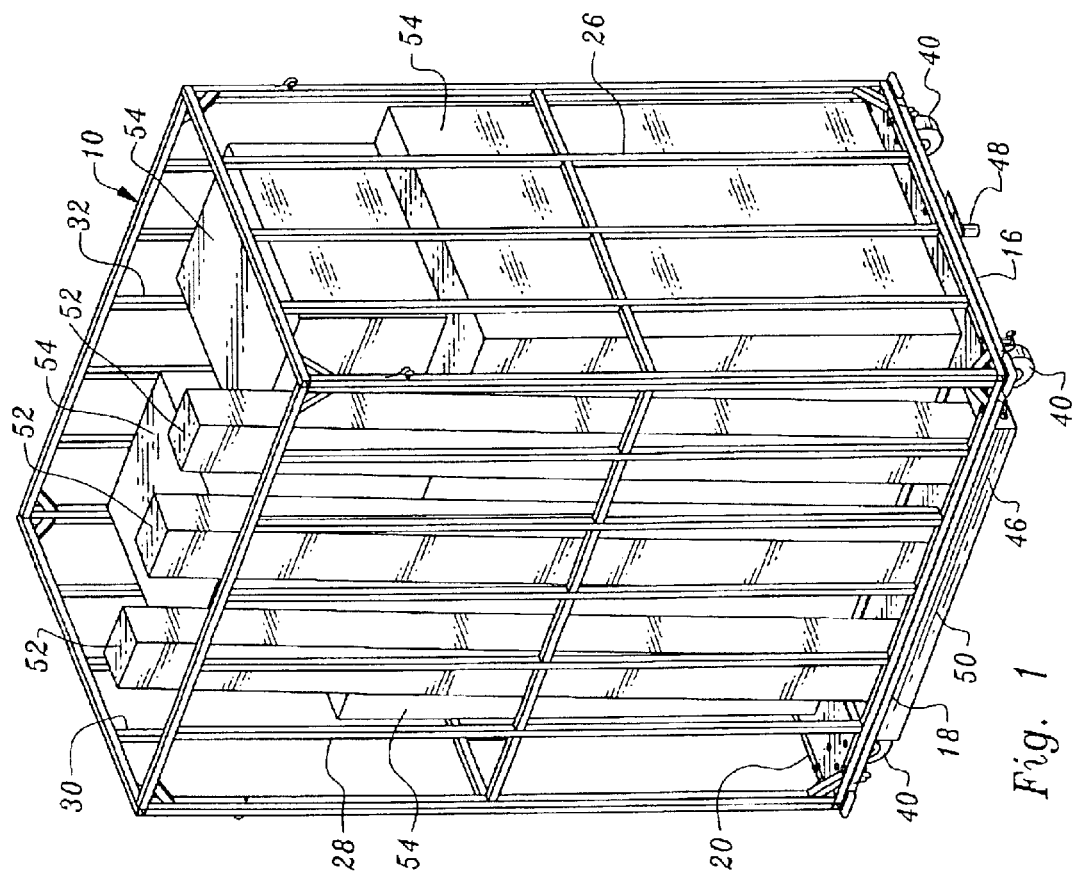

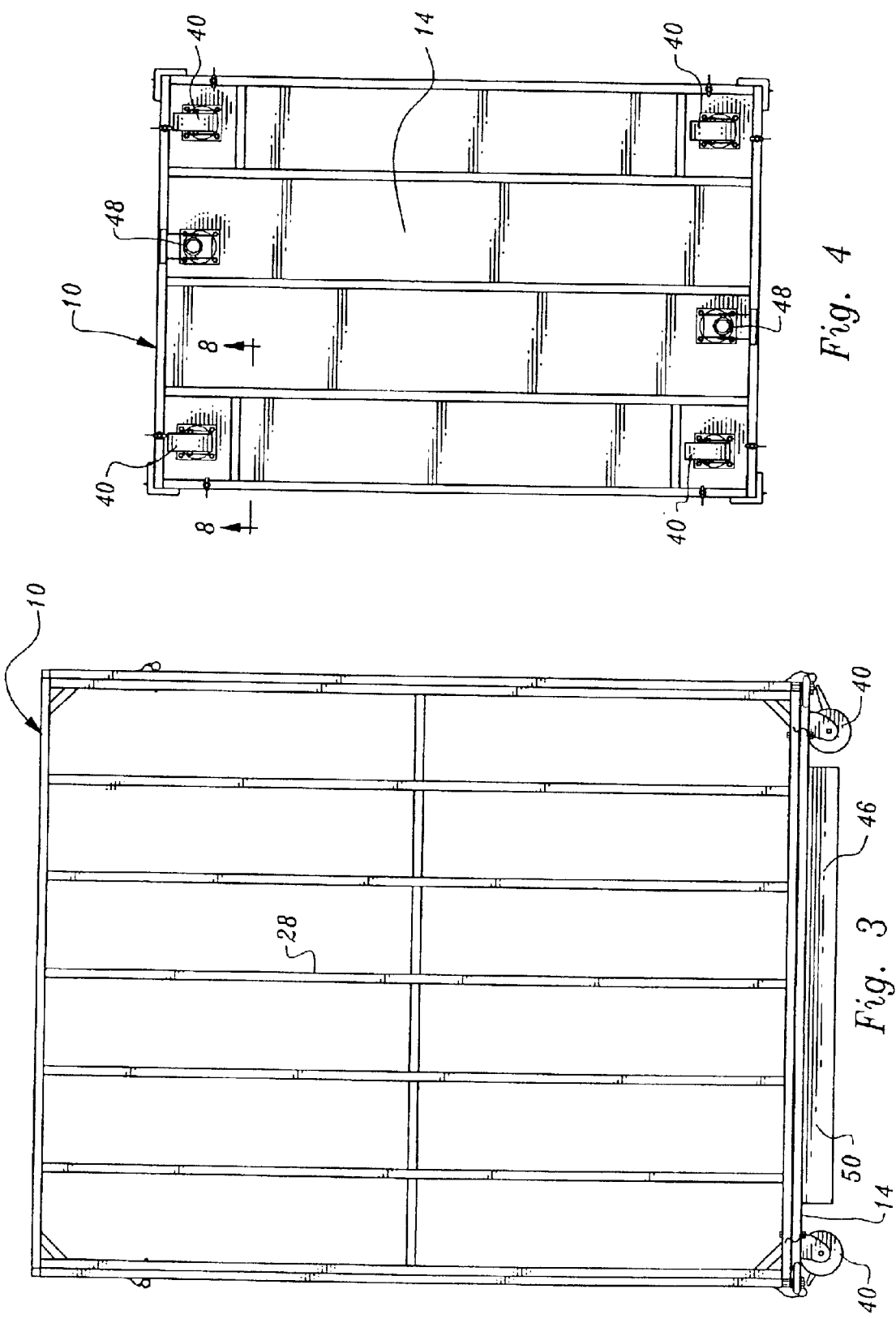

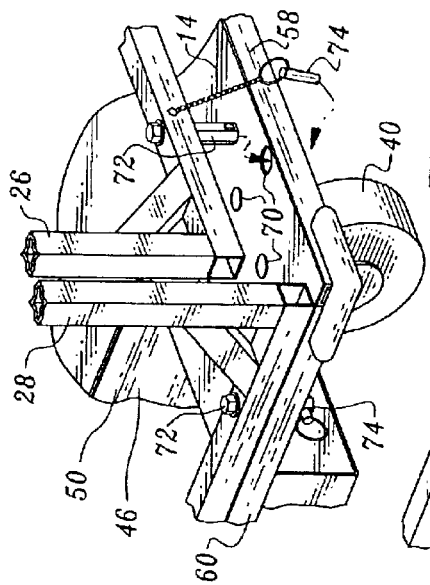
Fig. 6
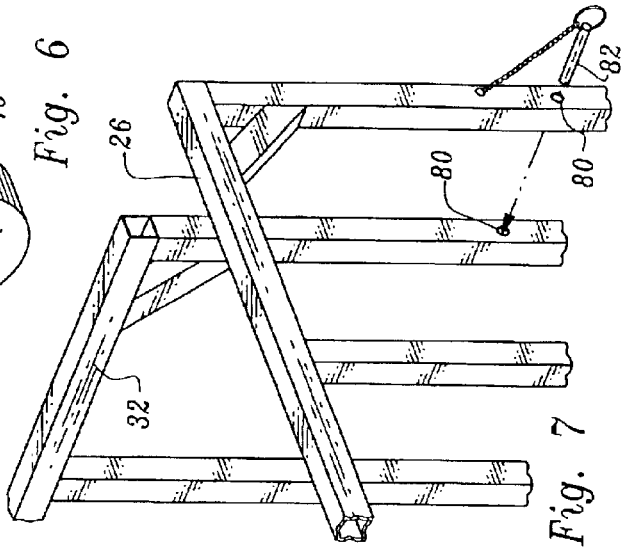
Fig. 7
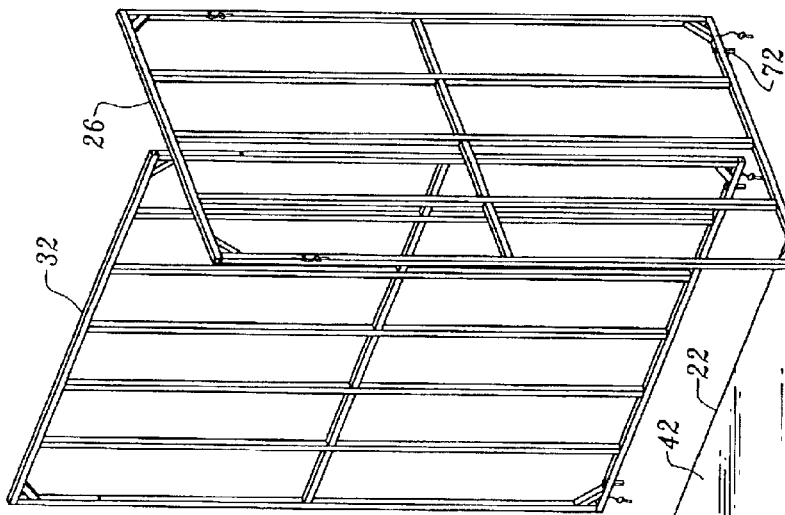
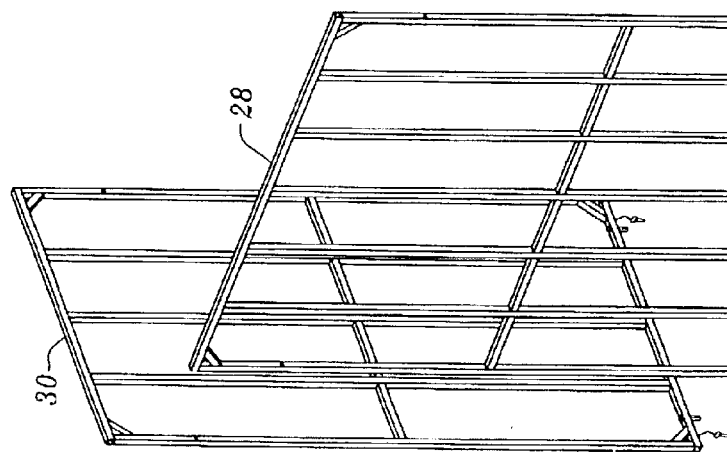
Fig. 5

CABINET TRANSPORT AND STORAGE CART

TECHNICAL FIELD

This invention relates to wheeled transport apparatus employable as a discrete module for transporting cabinet components or other components by truck.

BACKGROUND OF THE INVENTION

House cabinets and other types of similar cabinets have certain parts or components which are often grouped and shipped together for assembly on site. It is of course important that all of the correct components of a particular cabinet layout be delivered prior to installation. These components or parts include, for example, the cabinet housings, doors, hardware and molding. As will be seen below, the transport apparatus of the present invention provides for the "packaging" of all of these parts in a module of specialized construction which allows transport to take place in an efficient manner by standard size trucks, a plurality of these modules fitting within the confines of the storage compartment of a conventional standard size truck body. The various cabinet assemblies remain discrete units which can be transported and handled separately.

The following United States patents relate to storage containers, trolleys, carts or the like for use in transporting and/or storing goods of various types: U.S. Pat. No. DES.409,811, issued May 11, 1999, U.S. Pat. No. 3,861,554, issued Jan. 21, 1975, U.S. Pat. No. 3,888,379, issued Jun. 10, 1975, U.S. Pat. No. 5,595,305, issued Jan. 21, 1997, U.S. Pat. No. 4,222,579, issued Sep. 16, 1980, U.S. Pat. No. 4,275,665, issued Jun. 30, 1981, and U.S. Pat. No. 2,598,800, issued Jun. 3, 1952.

None of the prior art patents indicated above teach the unique combination of structural elements employed in the transport apparatus of the present invention.

DISCLOSURE OF INVENTION

The present invention relates to transport apparatus defining an interior and employable as a discrete module for transporting cabinet components (or other components) by truck.

The apparatus includes a base having a periphery of rectangular configuration and including four base sides.

Wheels project downwardly from the base for supporting the base.

Four side panels extend upwardly from the four base sides and first connector means releasably connects the four side panels to one another.

The transport apparatus also includes second connector means releasably connecting the four side panels to the base, each of the side panels being selectively wholly removable from the other three of the side panels and the base to obtain access to the interior of the apparatus, with the remaining three side panels connected to the base forming a self-supporting structure. With this approach, an individual can selectively obtain access to the interior of the apparatus from any one of the four sides thereof.

The transport apparatus also includes an open topped trough in the base for receiving elongated components to support the elongated components on end so that the elongated components will not engage the ceiling of a conventional truck body.

Other features, advantages and objects of the present invention will become apparent with reference to the following description and accompanying drawings.

BRIEF DESCRIPTION OF DRAWINGS

FIG. 1 is a perspective view of the transport apparatus of the present invention holding cabinet components, including elongated components;

FIG. 2 is an elevational view of one of the two narrower sides of the transport apparatus;

FIG. 3 is a view similar to FIG. 2, but illustrating one of the two wider sides of the apparatus;

FIG. 4 is a bottom view of the apparatus;

FIG. 5 is an exploded view showing all four side panels of the transport apparatus removed from the base thereof;

FIG. 6 is an enlarged perspective view illustrating details of the connector means employed to connect the side panels to the base of the transport apparatus;

FIG. 7 is a perspective view illustrating portions of two adjacent side panels and illustrating the side panels in the process of being connected together;

BEST MODE FOR CARRYING OUT THE INVENTION

Figure 9:
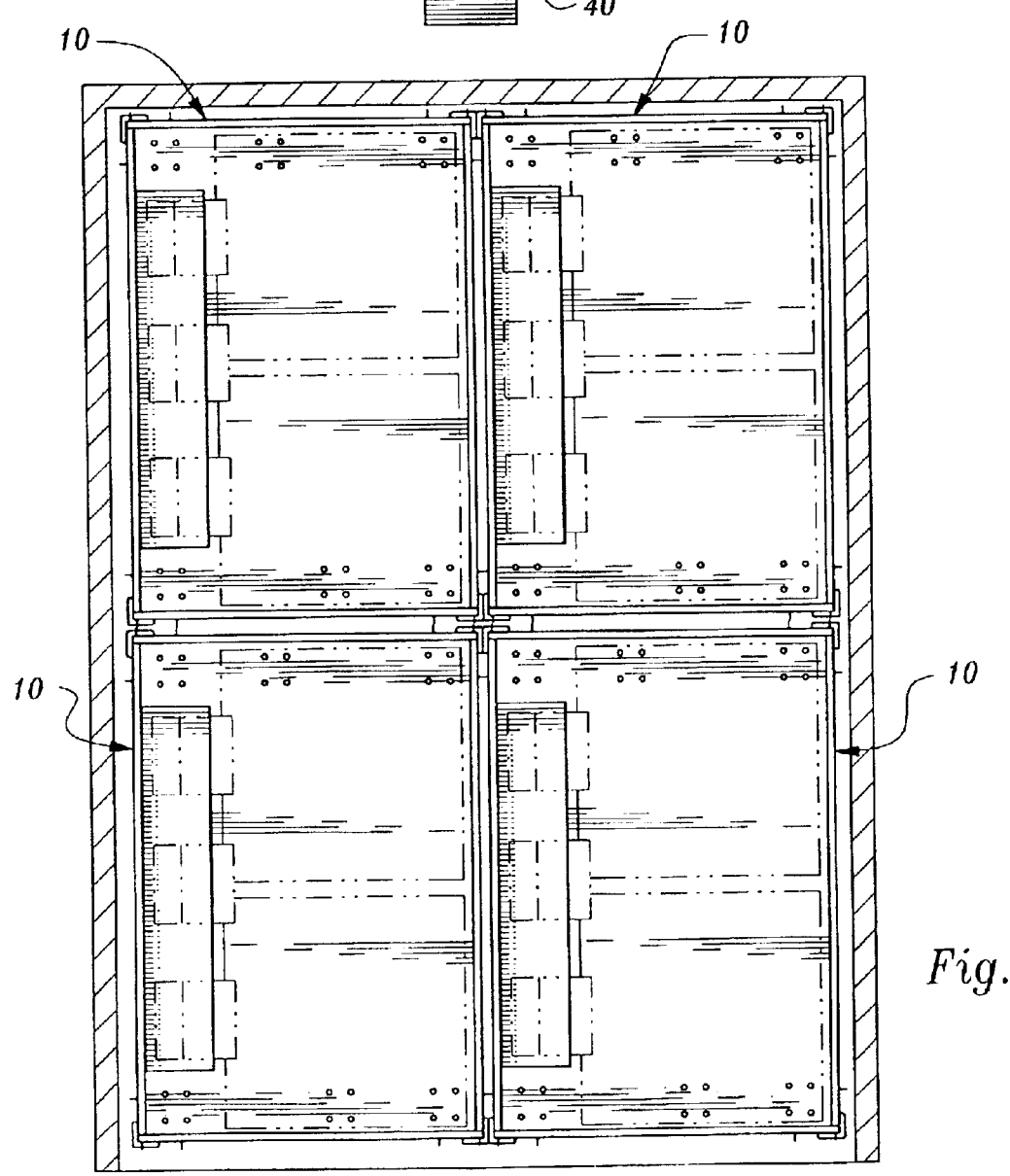
FIG. 9 is a somewhat schematic, top view illustrating how four modules or units of the transport apparatus are positioned within the confines of a truck.

Referring now to the drawings, a preferred form of transport apparatus constructed in accordance with the teachings of the present invention is illustrated. The transport apparatus defines an interior and is employable as a discrete module (along with other like modules) for transporting cabinet components by truck. The transport apparatus is sized and configured to provide for efficient use of the storage space provided by standard delivery trucks and long haul trailer trucks. Conventional delivery trucks have storage spaces with internal dimensions typically in the order of 24 ft in length, 97 ¾ in width and a height of 102 in. Long haul truck trailers typically have a height of 105 in., a width generally comparable to that of delivery trucks and a length in the order of 48 ft to 53 ft. FIG. 9 shows four such transport apparatus or modules 10 positioned in a truck body storage area 12. The transport apparatus can be readily transferred between trucks as an individual unit with the contents intact. For example, large numbers of units, each containing cabinet components for a particular job, may be transported by a long haul trailer truck to a distribution location where the load is divided into smaller numbers of units to be transported by smaller delivery trucks. The apparatus is sized to be accommodated by both long haul and delivery trucks and maximize use of the storage areas thereof.

The apparatus 10 has a base 14 suitably formed of aluminum or other metal having a periphery of rectangular configuration and including four base sides 16, 18, 20, 22. A preferable length for the two narrower base sides 16, 20 is 48 inches in length and for the two wider base sides 18, 22, 72 inches in length.

The transport apparatus includes four side panels 26, 28, 30 and 32 which are of open construction, being suitably formed for example from aluminum conduit secured together. The overall height of the transport apparatus is preferably 100.5 inches.

Wheels 40 mounted on casters connected to the base extend downwardly from the base and are used to support the base and side panels. Retractable lock members 48 of any suitable type may be employed to selectively engage the surface supporting the wheeled transport apparatus to prevent movement thereof.

Figure 8:
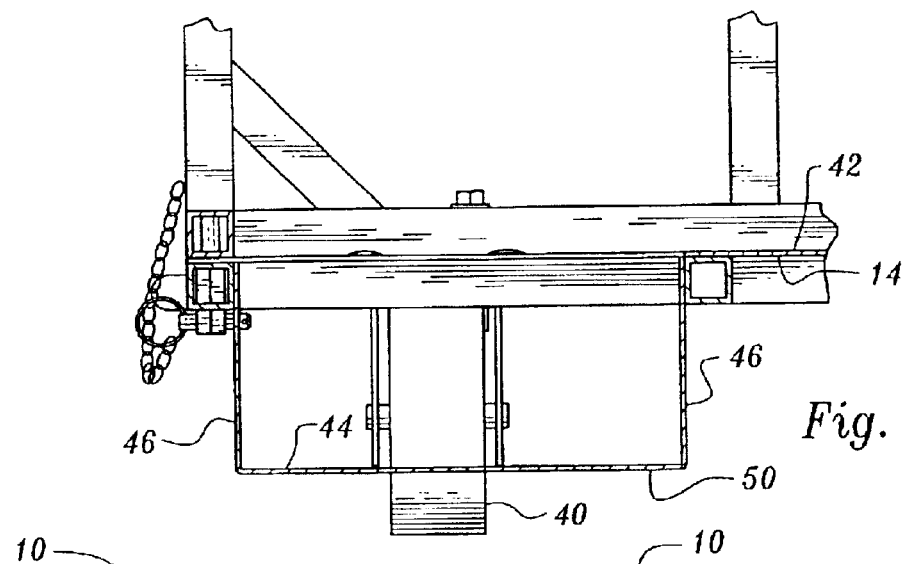
FIG. 8 is an enlarged, cross-sectional view taken along line 8-8 in FIG. 4.

The base 14 includes a primary base section 42 having an upper surface located above the tops of the wheels. The base also includes a secondary base section 44 (see FIG. 8) which is adjacent to the primary base section and has an upper surface disposed below the level of the primary base section upper surface and positioned below the level of the tops of the wheels 40.

Trough walls 46 interconnect the base sections and extend upwardly from the secondary base section 44 to the primary base section 42. The trough walls and the secondary base section define an open topped trough 50. As can be seen with reference to FIG. 1, the trough 50 is for receiving elongated cabinet components and supporting these elongated cabinet components on end. In FIG. 1, the elongated cabinet components may, for example, be lengths of molding (not shown) within elongated boxes 52. The trough allows the elongated components to be stood on end (and thus use the space of the transport apparatus efficiently) without projecting high enough to engage the top of the storage area of the truck body, which might otherwise be the case if the elongated components were stood on end on the elevated primary base section. FIG. 1 shows the boxes 52 disposed alongside other boxes 54 containing non-elongated cabinet components or parts.

The trough preferably has a length of 50 inches and the ends of the trough walls are spaced inwardly from the two opposed base sides 16, 20 disposed orthogonally to base side 18 partially comprised of the open topped trough. The primary base section 42 includes spaced extensions 58 located between the open topped trough and base sides 16 and 18. Location of the trough between two of the wheels 40 provides strength and stability to the structure without interfering with pushing or pulling of the apparatus.

Further stability at the location of the open topped trough is provided by an elongated rail 60 which is connected to the base at extensions 58 and extends along the open topped trough parallel to the trough walls 46.

Openings 70 are defined by the primary base section. These holes accommodate therein connector pins 72 attached to and extending downwardly from the side panels. Base lock pins 74 (see FIG. 6) are employed to lock the connector pins 72 in place on the base, the base lock pins passing through holes formed in the connector pins to restrain the connector pins and attached side panels from upward movement.

It will be noted that rail 60 provides stabilizing support for the bottom of side panel 28 in the vicinity of the open topped trough.

Connector means is also provided to releasably connect the four side panels to one another. In particular, holes 80 (see FIG. 7) are formed in the spaced vertical end post of the side panels. When the side panels are in position on the base 14, pins 82 are pushed into position through aligned holes 80 formed in vertical posts of adjoining side members to interconnect them.

An important feature of the present invention relies in the fact that any selected one of the side panels can be wholly removed from the other three of the side panels and the base to obtain access to the interior of the apparatus. This is accomplished by removing pins 82 from the holes 80 of the side panel to be removed. Then, the unlocked side panel can be lifted and removed. The remaining three side panels connected to the base and to one another form a self-supporting structure, enabling an individual to selectively obtain access to the interior of the apparatus from any one of the four sides thereof.

The invention claimed is:

1. Cabinet component transport apparatus defining an interior and employable as a discrete module for transporting a plurality of separate cabinet components, including elongated cabinet components, by truck and for conveying the cabinet components to and from trucks used to transport the cabinet components, said cabinet component transport apparatus comprising, in combination:

a base having a periphery of rectangular configuration and including four base sides;

wheels projecting downwardly from said base for supporting said base;

four side panels extending upwardly from said four base sides;

first connector means releasably connecting said four side panels to one another;

second connector means releasably connecting said four side panels to said base, each of said side panels being selectively wholly removable from the other three of said side panels and said base to obtain access to the interior of said apparatus, with the remaining three side panels connected to said base forming a self-supporting structure, whereby an individual can selectively obtain access to the interior of said cabinet component transport apparatus from any one of the four sides thereof, said base including a primary base section having an upper surface located above the tops of said wheels for supporting selected cabinet components and a secondary base section adjacent to said primary base section having an upper surface disposed below the level of said primary base section upper surface and positioned below the level of the tops of said wheels;

parallel trough walls interconnecting and extending upwardly from said secondary base section to said primary base section, said trough walls and said secondary base section defining an open topped, elongated, double-ended trough for receiving and supporting elongated cabinet components and supporting said elongated cabinet components on end, one of said base sides being partially comprised of said open topped trough; and an elongated rail connected to said base and extending along the length of said open topped, elongated trough parallel to said trough walls to reinforce said base and said open topped trough, the ends of said trough spaced inwardly from two opposed base sides disposed orthogonally to the base side at least partially comprised of said open topped, elongated trough, said primary base section including spaced extensions located between said open topped, elongated trough and said two opposed base sides, said open topped, elongated trough located between two of said wheels and said elongated rail extending beyond the ends of said trough and attached to said spaced extensions to provide stabilizing support for one of said side panels.

2. The cabinet component transport apparatus according to claim 1 wherein said primary base section defines a plurality of openings, said second connector means including connector pins extending downwardly from said side panels and positioned in said openings.

3. The cabinet component transport apparatus according to claim 2 additionally comprising base locks cooperable with said connector pins and said base for selectively retaining said connector pins in said openings.

4. The cabinet component transport apparatus according to claim 1 wherein said spaced extensions define openings, said second connector means including connector pins extending downwardly from a side panel extending along said open topped trough.

5. The cabinet component transport apparatus according to claim 1 wherein said side panels include spaced vertical posts defining holes therein, said first connector means including pins extending through aligned holes formed in vertical posts of adjoining side members.

6. The cabinet component transport apparatus according to claim 1 wherein said base includes two opposed base sides about 48 inches in length and two opposed base sides about 72 inches in length and wherein the overall height of said transport apparatus is about 100.5 inches.

7. The cabinet component transport apparatus according to claim 1 wherein said open topped trough is about 50 inches in length.

* * * * *